United States Patent
Romanek

(10) Patent No.: US 6,530,364 B1
(45) Date of Patent: Mar. 11, 2003

(54) VENTILATING DEVICE FOR MOTOR VEHICLE FUEL TANK

(75) Inventor: Christian Romanek, Noailles (FR)

(73) Assignee: Compagnie de Materiel et d'Equipements Techniques C.O.M.E.T., Senlis (FR)

( * ) Notice: Subject to any disclaimer, the term of this patent is extended or adjusted under 35 U.S.C. 154(b) by 0 days.

(21) Appl. No.: 09/646,867

(22) PCT Filed: Mar. 22, 1999

(86) PCT No.: PCT/FR99/00711

§ 371 (c)(1),
(2), (4) Date: Nov. 30, 2000

(87) PCT Pub. No.: WO99/50087

PCT Pub. Date: Oct. 7, 1999

(30) Foreign Application Priority Data

Mar. 27, 1998 (FR) .............................................. 98 04020

(51) Int. Cl.[7] .............................................. F02M 37/04
(52) U.S. Cl. ......................... 123/516; 137/43; 137/39
(58) Field of Search .................. 123/516, 518, 123/519, 520, 509, 521; 137/39, 43; 141/59

(56) References Cited

U.S. PATENT DOCUMENTS

| 4,050,471 A | * | 9/1977 | Anhegger et al. ............ 137/39 |
| 4,694,847 A | * | 9/1987 | Szlaga ......................... 137/39 |
| 4,760,858 A |   | 8/1988 | Szlaga |
| 5,666,989 A | * | 9/1997 | Roetker ........................ 137/43 |
| 5,687,778 A | * | 11/1997 | Harris .......................... 141/59 |
| 5,823,169 A | * | 10/1998 | Strohl et al. ................. 123/516 |
| 5,971,203 A | * | 10/1999 | Bae ............................. 137/43 |
| 6,289,916 B1 | * | 9/2001 | Romanek ..................... 137/43 |

FOREIGN PATENT DOCUMENTS

| EP | 0 803 671 A1 | 10/1997 |
| FR | 2 740 402 | 4/1997 |

* cited by examiner

*Primary Examiner*—Carl S. Miller
(74) *Attorney, Agent, or Firm*—Lowe Hauptman Gilman & Berner, LLP

(57) ABSTRACT

The invention concerns a ventilating device for a motor vehicle fuel tank wherein a valve (12) is equipped with a ball (20) arranged in a chamber (14) wherein emerges an intake orifice (16) which opens into the center of a lower wall (19) concave upper surface (22) of the chamber (19), the ball (20) being supported on the concave upper surface (22). The invention is characterised in that the slope, relative to the horizontal, of the concave upper surface (22) decreases in the direction radially away from the axis (A1).

7 Claims, 2 Drawing Sheets

VENTILATING DEVICE FOR MOTOR VEHICLE FUEL TANK

The invention relates to a venting system for an automobile vehicle fuel tank.

The invention relates more particularly to a venting system for an automobile vehicle fuel tank of the type in which a valve is provided with a ball which is placed in a chamber into which open an inlet orifice which has an axis and is connected to the tank and an outlet orifice, one orifice opens onto the center of a concave top face of a bottom wall of the chamber, the ball bears on the concave top face so that, when the vehicle is stopped and is substantially horizontal, the weight of the ball places it at the center of the concave surface where it closes the orifice whereas the ball is moved away from the orifice by vibrations generated by starting or movement of the vehicle and enables venting of the tank.

In the above type of system the top face of the inside wall of the chamber is usually circular and frustoconical with a vertical axis so that as soon as the vehicle is stopped the ball drops to the bottom of the cone to shut off the orifice at the center of the cone.

The angle at the apex of the cone is dictated by a number of parameters related in particular to the maximum inclination of the vehicle when stopped and the size of the ball, its size conditioning its weight and therefore conditioning closing of the valve when filling the tank causes a positive gas pressure in the tank which must not escape via the venting system.

This latter parameter, which conditions the sealing effect of the valve when the vehicle is stopped, therefore makes it necessary to arrive at a compromise between the diameter of the ball and the angle at the apex of the cone formed by the top bearing face of the valve. To avoid using a ball of excessively large diameter it is therefore necessary to use a bearing surface having a relatively small angle at the apex.

Using a small angle at the apex means that the ball remains substantially at the center of the frustoconical surface, even when the vehicle is moving, and thereby interferes with the flow of the gases through the valve.

An object of the invention is therefore to propose a new venting system of the above kind which reduces the size and therefore the cost of the ball and also satisfies simultaneously two contradictory requirements, namely a good seal of the valve when the vehicle is stopped and free flow of the gases through the valve when the vehicle is moving.

To this end, the invention proposes a venting system for an automobile vehicle fuel tank of the type in which a valve is provided with a ball which is placed in a chamber into which open an inlet orifice which has an axis and is connected to the tank and an outlet orifice, one orifice opens onto the center of a concave top face of a bottom wall of the chamber, the ball bears on the concave top face so that, when the vehicle is stopped and is substantially horizontal, the weight of the ball places it at the center of the concave surface where it closes the orifice whereas the ball is moved away from the orifice by vibrations generated by starting or movement of the vehicle and enables venting of the tank, characterized in that the inclination to the horizontal of the concave top surface decreases in the radial direction away from the axis.

According to other features of the invention:
 the inclination varies continuously;
 the inclination varies discontinuously;
 the concave top face includes a frustoconical central first annular part around the orifice to be closed, with its larger end at the top, which has a vertical axis and forms a bearing surface for the ball when the latter is in the closing position, and in that the concave top surface includes a frustoconical peripheral second annular part, around the first part, also with its larger end at the top, which has a vertical axis and whose angle at the apex is greater than that of the bearing surface so that it has a shallow slope;
 the peripheral part has an angle at the apex of the order of 160 degrees;
 the bearing surface has an angle at the apex of the order of 145 degrees; and
 the ball has a diameter of approximately 12.7 mm.

Other features and advantages of the invention will become apparent on reading the following detailed description, which refers to the accompanying drawings, in which.

Figure 1:
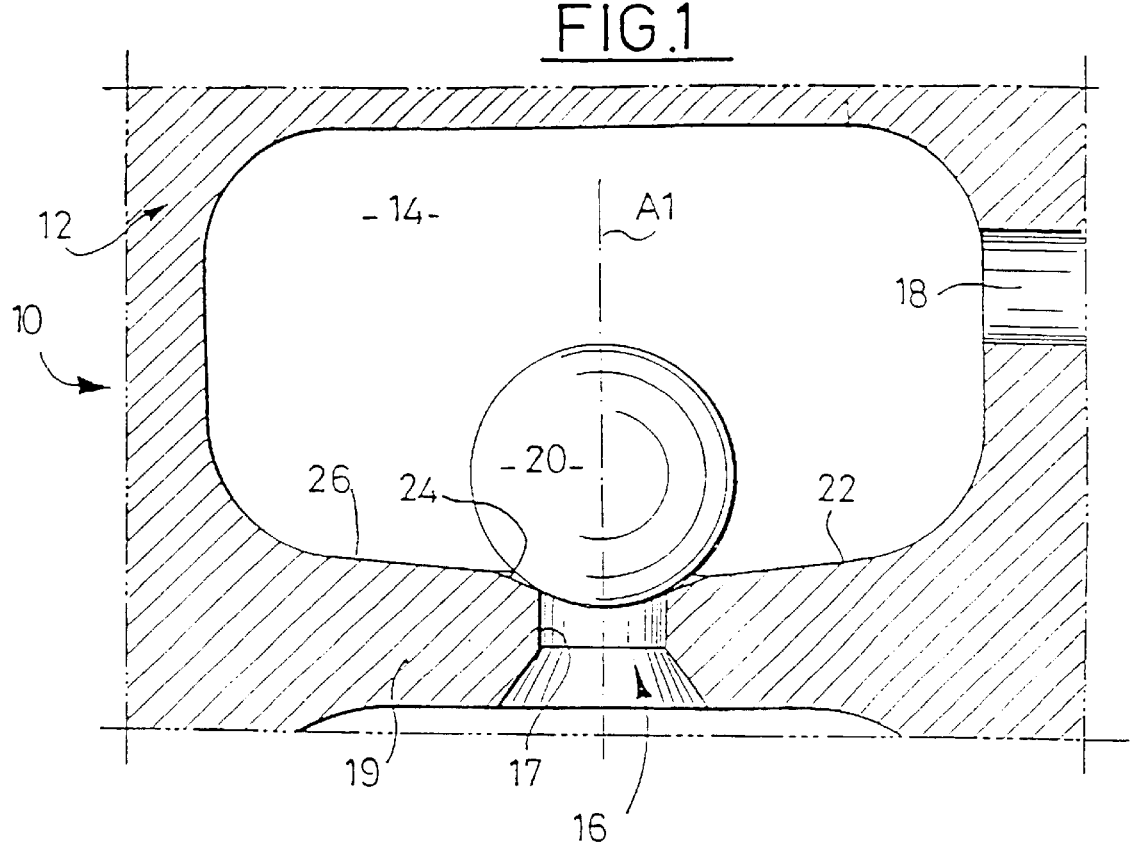
FIG. 1 is a diagrammatic sectional view of a valve of a venting system conforming to the teachings of the invention, shown when the vehicle is stopped.
Figure 2:
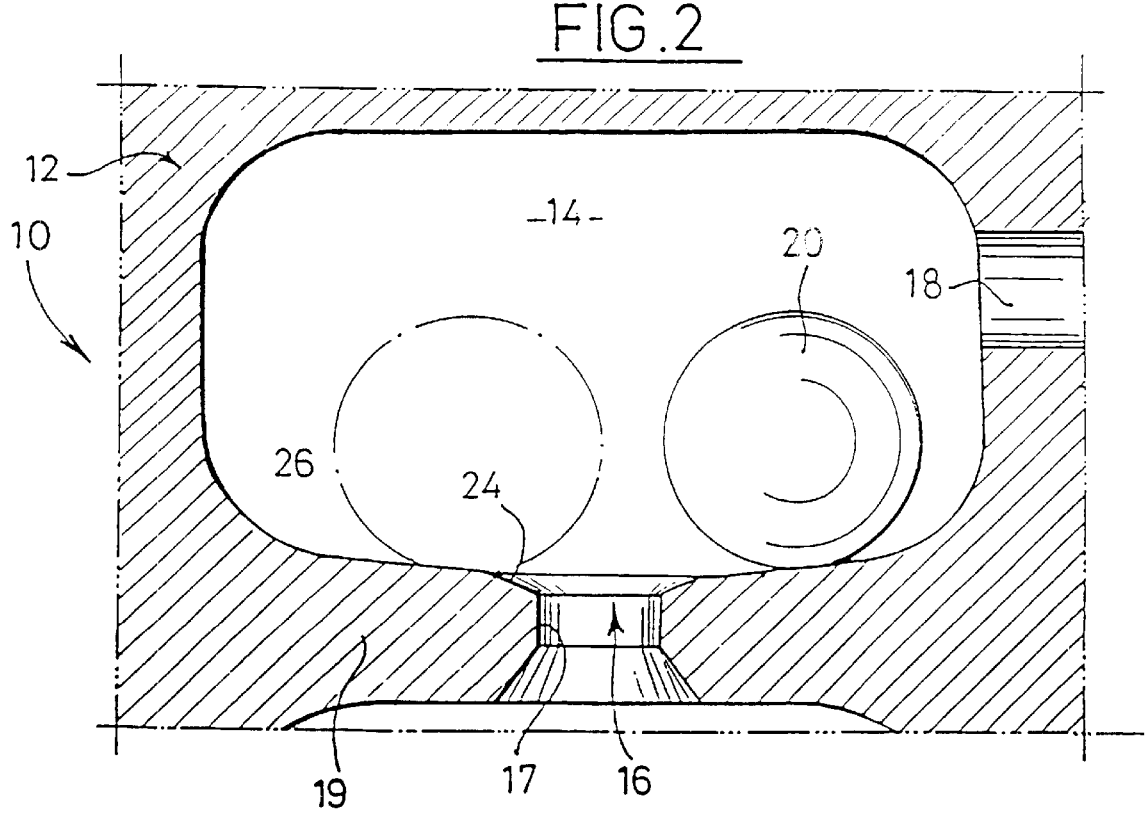
FIG. 2 is a view similar to that of FIG. 1, showing the valve when the vehicle is moving.

In a manner that is known in the art, for example as described in the document FR-A-2 740 402, automobile vehicle fuel tanks are generally provided with a venting system which includes a vent pipe which has a bottom portion which opens into the tank at the top of the tank and a top portion which is connected to a vapor recovery and filter system, for example. A valve is included between the top and bottom portions of the vent pipe.

The venting system compensates the fall in the fuel level in the tank by enabling air to enter the tank so that the pressure therein is substantially constant.

In contrast, the system must also enable evacuation of gases compressed because of an increase in temperature, for example, to avoid deformation of the tank which could cause it to rupture.

However, it is desirable for the vapor in the tank to be unable to escape directly to the atmosphere when the vehicle is stopped, whether by evaporation or when filling the tank with fuel.

The venting system 10, a portion of which is shown in the figures, therefore includes a valve 12 for closing the venting circuit when the vehicle is stopped.

The valve 12 includes a chamber 14 which has at least one inlet orifice 16 and one outlet orifice 18. The inlet orifice 16 passes through a bottom horizontal wall 19 which delimits the chamber 14, is delimited by an inside cylindrical surface 17, has an axis A1 and is connected to the fuel tank, for example. The outlet orifice 18 opens into a lateral or top wall of the chamber 14, for example.

A ball 20 is provided inside the chamber 14 and its weight presses it onto the top face 22 of the bottom wall 19 of the chamber 14. According to the teachings of the invention, the top face 22, into which the orifice 16 opens, has a circular annular central first part 24 which is frustoconical, with the larger end at the top, and has a vertical axis A1. The annular central part 24 is adapted to form a bearing surface for the ball 20 when the vehicle is stopped, as shown in FIGS. 1 and 3.

Around the bearing surface 24 the top face 22 has a peripheral part 26, on which the ball 20 is moved by vibration generated when the vehicle is started or moving, which is also frustoconical, with the wider end at the top, and has a vertical axis A1.

Figure 3:
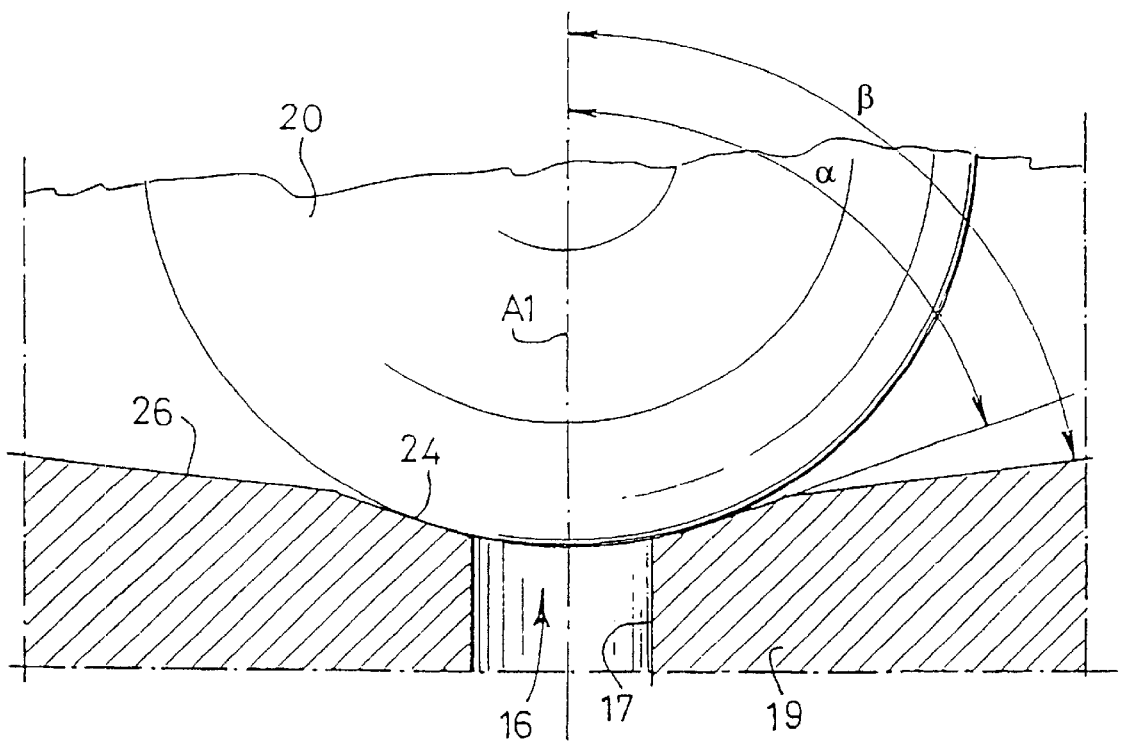
FIG. 3 is an enlarged view of a detail from FIG. 1 showing more particularly the difference in cone angle of the bearing surface part compared to the peripheral part of the valve according to the invention.

According to the teachings of the invention, and as can be seen in FIG. 3 in particular, the frustoconical bearing surface 24 has a half-angle α at the apex which is less than the half-angle β at the apex of the peripheral part 26.

The bearing surface 24 therefore has an inclination to the horizontal which is greater than that of the peripheral part 26.

The slope of the peripheral part 26 can be relatively shallow. Consequently, the angle β can be relatively large. The only constraint on the angle β is that the ball must necessarily return to the center of the top face 22 regardless of the position of the vehicle relative to the horizontal when stopped. Thus a half-angle at the apex of approximately 80° can be chosen for the frustoconical peripheral bearing surface 26, i.e. an angle at the apex of approximately 160 degrees.

In contrast, when the ball 20 is in the closing position, bearing on the bearing surface 24, it is not sufficient for it to be held in that position. It is also necessary for the ball 20 to be able to resist a positive pressure in the tank, for example due to the fact that the tank is being filled with fuel, even if the vehicle is not horizontal.

If the vehicle is not horizontal, the resultant of the force of gravity on the ball is no longer coaxial with the axis A1 of the orifice 16 and the bearing surface 24. Consequently, the force needed to raise the ball 20 generated by the pressure of the gases on the bottom part of the ball closing the orifice 16 represents only a small percentage of the weight of the ball.

To prevent the ball from being lifted, there is therefore a choice between reducing the half-angle at the apex of the frustoconical bearing surface 24 or increasing the diameter of the ball. However, the latter solution has the drawback of increasing its cost and overall size.

A good compromise might be to choose a ball with a diameter of 12.7 mm, for example, and a frustoconical bearing surface 24 whose half-angle at the apex is approximately 72.5°, representing an angle at the apex of 145 degrees.

The diameter of the inlet orifice 16 must be less than that of the ball 20, of course, but it must also be less than the diameter of the contact circle where the ball 20 bears on the bearing surface 24. The diameter of the orifice 16 must therefore be less than the diameter of the ball 20 multiplied by the sine of the half-angle at the apex of the bearing surface 24.

This cone angle assures effective retention of the ball 20 in the closing position, but if vibration causes the ball 20 to move toward the peripheral part 26 it is no longer returned too forcefully toward the center of the top face 22.

Accordingly, by virtue of the new two-part design of the top face 22 on which the ball 20 rests, it is possible to obtain both a good seal at the valve when the vehicle is stopped, including if the vehicle is steeply tilted, and, in contrast, free flow of the gases through the valve 12 if vibration of the moving vehicle moves the ball 20 toward the peripheral part 26.

In the embodiment of the invention that has just been described there is a discontinuity in the slope between the bearing surface 24 and the peripheral part 26. These two parts of the top face 22 could of course be joined by a surface element such that the slope is varied continuously along a radius extending out from the axis A1.

Similarly, the two parts 24, 26 need not have strictly frustoconical surfaces. However, the slope of the top face must decrease overall in the radial direction away from the axis A1.

What is claimed is:

1. A venting system for an automobile vehicle fuel tank of the type in which a valve (12) is provided with a ball (20) which is placed in a chamber (14) into which open an inlet orifice (16) which has an axis (A1) and is connected to the tank and an outlet orifice (18), one orifice (16) opens onto the center of a concave top face (22) of a bottom wall (19) of the chamber (14), the ball (20) bears on the concave top face (22) so that, when the vehicle is stopped and is substantially horizontal, the weight of the ball (20) places it at the center of the concave surface (22) where it closes the orifice (16) whereas the ball (20) is moved away from the orifice (16) by vibrations generated by starting or movement of the vehicle and enables venting of the tank, characterized in that the inclination to the horizontal of the concave top surface (22) decreases in the radial direction away from the axis (A1).

2. A venting system according to claim 1, characterized in that the inclination varies continuously.

3. A venting system according to claim 1, characterized in that the inclination varies discontinuously.

4. A venting system according to claim 3, characterized in that the concave top face (22) includes a frustoconical central first annular part (24) around the orifice to be closed, with its larger end at the top, which has a vertical axis (A1) and forms a bearing surface for the ball (20) when the latter is in the closing position, and in that the concave top surface (22) includes a frustoconical peripheral second annular part (26), around the first part (24), also with its larger end at the top, which has a vertical axis (A1) and whose angle (β) at the apex is greater than that (α) of the bearing surface (24) so that it has a shallow slope.

5. A venting system according to claim 4, characterized in that the peripheral part (26) has an angle (β) at the apex of the order of 160 degrees.

6. A venting system according to either claim 4 characterized in that the bearing surface (24) has an angle (α) at the apex of the order of 145 degrees.

7. A venting system according to claim 1, characterized in that the ball (20) has a diameter of approximately 12.7 mm.

* * * * *